United States Patent
Oomura

(10) Patent No.: US 8,092,196 B2
(45) Date of Patent: Jan. 10, 2012

(54) STRUCTURE FOR SUPPORTING A SLEEVE MEMBER IN AUTOMATIC TRANSMISSION

(75) Inventor: Tomohiro Oomura, Fuji (JP)

(73) Assignee: JATCO Ltd, Fuji-shi (JP)

( * ) Notice: Subject to any disclaimer, the term of this patent is extended or adjusted under 35 U.S.C. 154(b) by 368 days.

(21) Appl. No.: 12/498,017

(22) Filed: Jul. 6, 2009

(65) Prior Publication Data

US 2010/0005925 A1  Jan. 14, 2010

(30) Foreign Application Priority Data

Jul. 11, 2008  (JP) .................................. 2008-181185

(51) Int. Cl.
*F04B 35/04* (2006.01)
*F16C 3/00* (2006.01)
*F16H 3/72* (2006.01)

(52) U.S. Cl. ......... 417/410.4; 475/5; 475/347; 464/182; 464/183

(58) Field of Classification Search .................. 417/321, 417/410.4; 475/5, 347; 464/180, 182, 183
See application file for complete search history.

(56) References Cited

U.S. PATENT DOCUMENTS

| 4,127,080 A | 11/1978 | Lakiza et al. |
| 4,949,821 A * | 8/1990 | Murota et al. ............... 192/3.21 |
| 7,413,417 B2 * | 8/2008 | Klaus et al. ................... 417/366 |
| 7,489,114 B2 * | 2/2009 | Nomura et al. ................ 322/33 |
| 2005/0265858 A1 | 12/2005 | Klaus et al. |
| 2007/0225098 A1 | 9/2007 | Tabata et al. |
| 2010/0005925 A1 | 1/2010 | Oomura |

FOREIGN PATENT DOCUMENTS

| DE | 10 2005 040 0770 A1 | 3/2007 |
| JP | 07-076229 A | 3/1995 |
| JP | 2006-194299 A | 7/2006 |
| WO | WO 2004/042257 A1 | 5/2004 |

OTHER PUBLICATIONS

U.S. Appl. No. 12/498,040, filed Jul. 6, 2009, Oomura.
T. Oomura, U.S. PTO Office Action, U.S. Appl. No. 12/498,040, dated Aug. 8, 2011, 11 pages.

* cited by examiner

*Primary Examiner* — Charles Freay
(74) *Attorney, Agent, or Firm* — Foley & Lardner LLP

(57) ABSTRACT

A sleeve supporting structure for an automatic transmission, including a sleeve member disposed on a radial outside of an input shaft, a rotational shaft portion disposed in a motor, an oil pump housing, and a stationary member supporting an outer circumferential surface of the rotational shaft portion and including a projection that projects toward a side of the oil pump. The sleeve member has one axial end portion overlapped with the rotational shaft portion in the radial direction thereof and an opposite axial end portion meshing with an inner gear of the oil pump, and is supported by an inner circumferential surface of the oil pump housing and an inner circumferential surface of the rotational shaft portion. The projection of the stationary member is fitted onto an outer circumferential surface of the oil pump housing so as to form a faucet joint in cooperation therewith.

8 Claims, 2 Drawing Sheets

STRUCTURE FOR SUPPORTING A SLEEVE MEMBER IN AUTOMATIC TRANSMISSION

BACKGROUND OF THE INVENTION

The present invention relates to a structure for supporting a sleeve member in an automatic transmission.

There have been various types of automatic transmissions to which an assist motor is incorporated. Japanese Patent Application First Publication No. 2006-194299 describes an automatic transmission including a motor shaft supporting structure in which a rotational shaft of a motor is supported by a motor housing through two bearings that are provided in an axial direction of the rotational shaft of the motor. Japanese Patent Application First Publication No. 7-076229 describes an automatic transmission including an oil pump drive shaft supporting structure in which a drive shaft for an oil pump is supported by a bushing that is provided inside an oil pump housing.

SUMMARY OF THE INVENTION

Even though the motor shaft supporting structure and the oil pump drive shaft supporting structure of the respective conventional arts described above are simply combined in an automatic transmission in which a motor and an oil pump are disposed adjacent to each other in an axial direction of the automatic transmission, the motor shaft and the oil pump drive shaft are provided separately from each other, and therefore, there will be caused problems such as increase in an axial length of the automatic transmission. Further, since the drive shaft for the oil pump is supported by only the bushing, it is difficult to assemble the drive shaft for the oil pump to the automatic transmission with high accuracy in positioning of an axis of the drive shaft, thereby failing to obtain stable rotation of the oil pump.

An object of the present invention is to provide a sleeve supporting structure for an automatic transmission including a motor and an oil pump which are disposed adjacent to each other in an axial direction of the automatic transmission, in which a sleeve-shaped oil pump drive shaft for driving the oil pump can be assembled to the automatic transmission with high accuracy in positioning of an axis of the oil pump drive shaft and an increase in an axial length of the automatic transmission can be suppressed.

In one aspect of the present invention, there is provided a sleeve supporting structure for an automatic transmission, the automatic transmission including an input shaft, a motor and an oil pump with an inner gear which are disposed adjacent to each other in an axial direction of the input shaft, the sleeve supporting structure comprising:

a sleeve member that is disposed on a radial outside of the input shaft, the sleeve member is configured to transmit rotation of the input shaft to the inner gear of the oil pump, a rotational shaft portion that is disposed in the motor;

an oil pump housing that accommodates the inner gear; and a stationary member that supports an outer circumferential surface of the rotational shaft portion, the stationary member including a projection that projects toward a side of the oil pump, wherein the sleeve member has one axial end portion that is overlapped with the rotational shaft portion in a radial direction of the sleeve member and an opposite axial end portion that is in meshing engagement with the inner gear, and the sleeve member is supported by an inner circumferential surface of the oil pump housing and an inner circumferential surface of the rotational shaft portion, and wherein the projection of the stationary member is fitted onto an outer circumferential surface of the oil pump housing so as to form a faucet joint in cooperation with the oil pump housing.

DETAILED DESCRIPTION OF THE INVENTION

Figure 1:
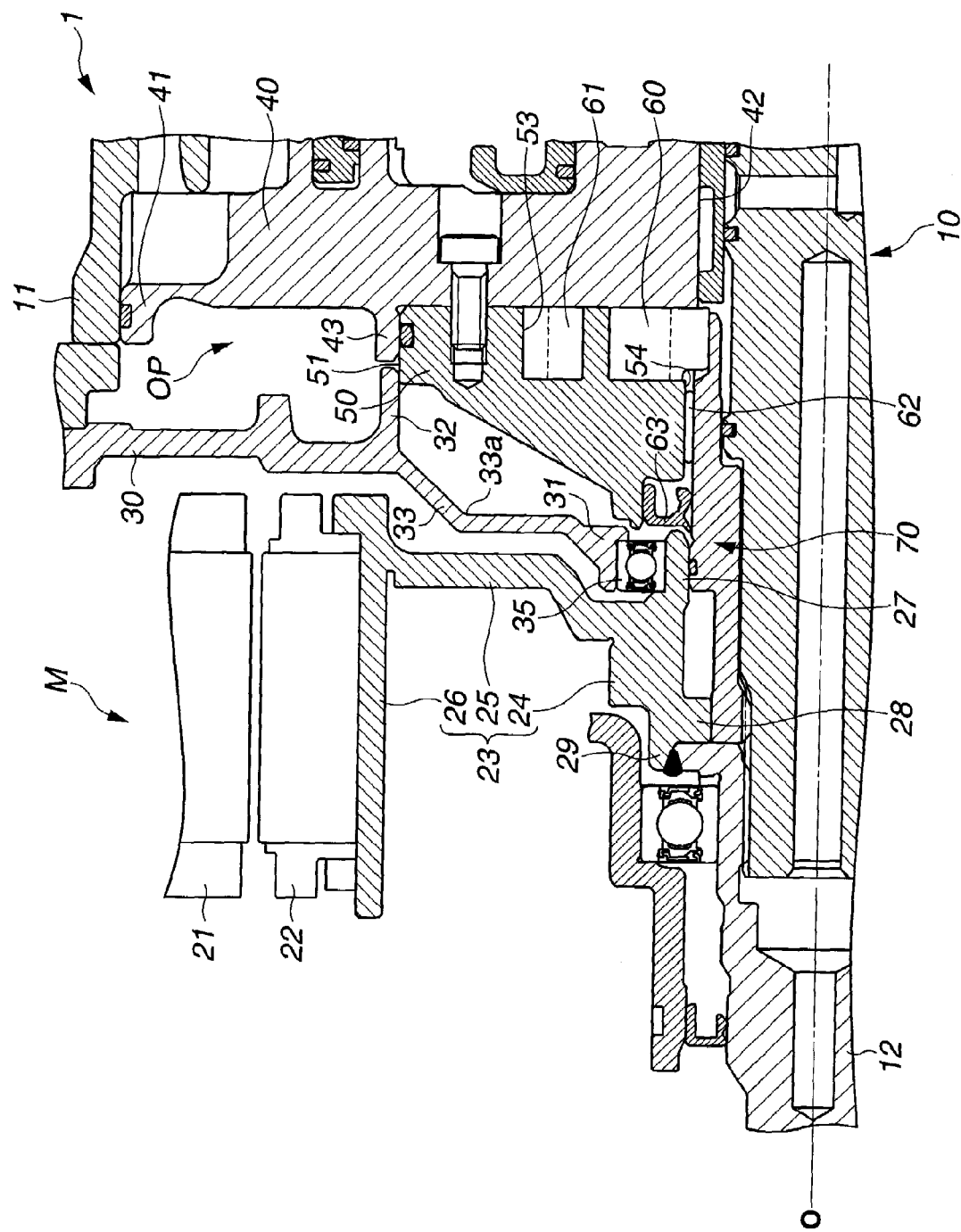
FIG. 1 is a sectional view of a part of an automatic transmission, to which a support structure according to an embodiment of the present invention is incorporated.
Figure 2:
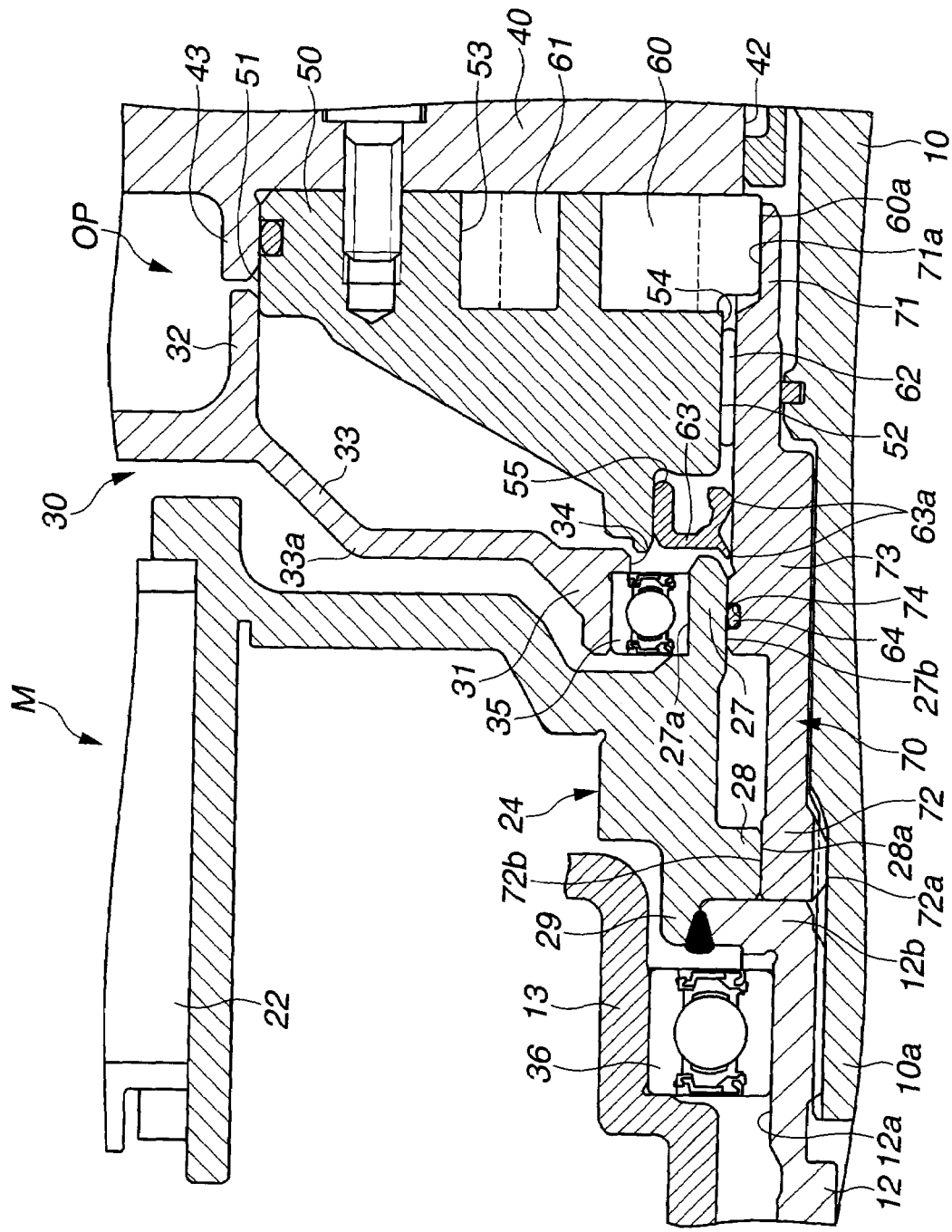
FIG. 2 is an enlarged diagram showing an essential part of the support structure shown in FIG. 1.

In the followings, an embodiment of the present invention will be described with reference to the accompanying drawings. In this embodiment, a structure for supporting a sleeve member in an automatic transmission is applied to supporting a sleeve-shaped oil pump drive shaft that transmits rotation of an input shaft of the automatic transmission to an inner gear of an oil pump. FIG. 1 illustrates an enlarged section, taken along an axis of the automatic transmission, of a part of the automatic transmission, to which the structure according to the embodiment of the present invention is incorporated. FIG. 2 illustrates an enlarged view of an essential part of the structure shown in FIG. 1.

As illustrated in FIG. 1, automatic transmission 1 includes motor M and oil pump OP which are disposed in sequence from a left side as viewed in FIG. 1 (that is, from a side of an engine, not shown) in a direction of axis O of input shaft 10 of automatic transmission 1. Motor M and oil pump OP are disposed adjacent to each other in the axial direction of input shaft 10.

Motor M includes stator 21 that is disposed on an inner circumferential surface (not shown) of transmission case 11, and rotor 22 that is opposed to stator 21 in a radial direction of motor M perpendicular to a rotation axis of motor M, i.e., in a direction perpendicular to the axial direction of automatic transmission 1. Motor M is disposed within a space on the left side in FIG. 1 which is defined by partition wall 30. Partition wall 30 forms a part of a motor housing.

Rotor 22 is connected with input shaft 10 through rotor support 23 and transmission shaft 12 as explained later, and is operative to make unitary rotation with input shaft 10. Rotor support 23 includes rotational shaft portion 24, extension 25 radially outwardly extending from rotational shaft portion 24, and support portion 26 connected with extension 25. Rotational shaft portion 24 is fitted onto oil pump drive shaft 70 and fixed thereto. Extension 25 extends from an end portion of rotational shaft portion 24 which is located on a side of oil pump OP, in a radially outward direction of motor M. Rotor 22 is fixed to and supported by support portion 26. Oil pump drive shaft 70 is disposed on a radial outside of input shaft 10 and in coaxial with input shaft 10. Specifically, oil pump drive shaft 70 is in the form of a sleeve member, into which input shaft 10 is inserted. Oil pump drive shaft 70 has one axial end portion that is overlapped with rotational shaft portion 24 of rotor support 23 of motor M in a radial direction of input shaft 10, and an opposite axial end portion that is in meshing engagement with inner gear 60 of oil pump OP. Oil pump drive shaft 70 extends between the axial end portions opposed to each other in an axial direction thereof.

As shown in FIG. 2, rotational shaft portion 24 includes axial extension 27 that extends from one axial end portion of rotational shaft portion 24 toward the side of oil pump OP in an axial direction of rotational shaft portion 24, i.e., in the axial direction of motor M. Rotational shaft portion 24 further includes radial extension 28 that extends from an opposite axial end portion of rotational shaft portion 24 in a radially inward direction of rotational shaft portion 24, i.e., in a radially inward direction of motor M. Radial extension 28 is fitted onto outer circumferential surface 72b of reduced diameter portion 72 of oil pump drive shaft 70 which is reduced in diameter, such that inner circumferential surface 28a of extension 28 is in contact with outer circumferential surface 72b of reduced diameter portion 72. Radial extension 28 and reduced diameter portion 72 which are fitted to each other cooperate with each other to form a faucet joint. Radial extension 28 and reduced diameter portion 72 have axial end surfaces which are directed to the side of the engine and in alignment with each other in the radial direction of input shaft 10.

Axial extension 27 of rotational shaft portion 24 is rotatably supported by support portion 31 of partition wall 30 through radial bearing 35. Support portion 31 is formed on a radial inside of partition wall 30 that serves as a stationary member. Radial bearing 35 is disposed between outer circumferential surface 27a of axial extension 27 and an inner circumferential surface of support portion 31. Inner circumferential surface 27b of axial extension 27 is contacted with an outer circumferential surface of middle portion 73 of oil pump drive shaft 70 which is located in a substantially middle position in the axial direction of oil pump drive shaft 70, through O-ring 64.

Partition wall 30 has projection 32 on a surface thereof that is opposed to the side of oil pump OP. Projection 32 extends in the axial direction of input shaft 10 and has a ring shape having a center aligned with axis O of input shaft 10. A tip end portion of projection 32 is fitted onto outer circumferential surface 51 of oil pump housing 50 over the entire circumference thereof so as to form a faucet joint in cooperation with oil pump housing 50. An inner circumferential surface of the tip end portion of projection 32 and outer circumferential surface 51 of oil pump housing 50 are in contact with each other over the entire circumferences thereof.

Partition wall 30 has a reduced and uniform thickness so as to be elastically deformable in a region extending from support portion 31 to the tip end portion of projection 32 which is fitted onto outer circumferential surface 51 of oil pump housing 50. Specifically, partition wall 30 includes reduced thickness portion 33 that is disposed between support portion 31 and the tip end portion projection 32. Reduced thickness portion 33 extends from support portion 31 in the radially outward direction of input shaft 10 and is bent at bend 33a in a middle portion of reduced thickness portion 33 in such a direction as to be apart from motor M. In other words, reduced thickness portion 33 is bulged in such a direction as to be apart from oil pump housing 50, so that a total length of reduced thickness portion 33 which extends on both sides of bend 33a is increased to thereby enhance the elastic deformability of reduced thickness portion 33.

As shown in FIG. 2, in the support structure according to this embodiment, rotational shaft portion 24 of motor M is supported by partition wall 30 through radial bearing 35. With this structure, vibration that is caused upon driving motor M is inputted to partition wall 30 through rotational shaft portion 24 and radial bearing 35. However, since the region of partition wall 30 which extends to the tip end portion of projection 32 through reduced thickness portion 33 is elastically deformable, the vibration inputted to partition wall 30 can be damped owing to elastic deformation of reduced thickness portion 33 and projection 32. Therefore, even when the tip end portion of projection 32 which is fitted onto outer circumferential surface 51 of oil pump housing 50 directly undergoes a large stress that is caused due to the vibration, deformation of oil pump housing 50 can be suppressed to thereby cause no problem in driving oil pump OP.

Oil pump OP is a gear pump that is provided between oil pump cover 40 and oil pump housing 50 disposed on the side of motor M. Oil pump OP is so constructed as to produce hydraulic pressure by rotating inner gear 60 and outer gear 61 with mutual meshing in an eccentric state relative to each other.

Oil pump cover 40 has a generally disk shape when viewed from an axial direction of oil pump OP. As shown in FIG. 1, oil pump cover 40 is fitted into transmission case 11 through engaging portion 41 that is formed on an outer circumferential surface of oil pump cover 40. Oil pump cover 40 has opening 42 at a central portion thereof which extends through oil pump cover 40 in the axial direction of input shaft 10 of automatic transmission 1. Input shaft 10 extends into transmission case 11 through opening 42. Further, oil pump cover 40 has circumferential wall 43 on a surface thereof which is opposed to the side of motor M. Circumferential wall 43 extends in the axial direction of oil pump OP and has an annular shape having a center aligned with axis O of input shaft 10.

Circumferential wall 43 has an inner diameter that is equivalent to an outer diameter of oil pump housing 50. Oil pump housing 50 is assembled to oil pump cover 40 by fitting outer circumferential surface 51 of oil pump housing 50 onto an inner circumferential surface of circumferential wall 43.

As shown in FIG. 2, oil pump housing 50 has gear chamber 53 on a surface thereof which is opposed to a side of oil pump cover 40. Gear chamber 53 accommodates inner gear 60 and outer gear 61 therein. Inner gear 60 accommodated in gear chamber 53 is coupled with connecting portion 71 of oil pump drive shaft 70 at coupling portions thereof. Specifically, inner gear 60 has a coupling portion on inner circumferential surface 60a, and connecting portion 71 has the coupling portion on outer circumferential surface 71a corresponding to the coupling portion of inner gear 60. The respective coupling portions have a width across flat structure including substantially flat surfaces which are spaced from each other along the circumferential direction of inner gear 60 and connecting portion 71. The substantially flat surfaces of the coupling portion on inner circumferential surface 60a are in mating contact with the substantially flat surfaces of the coupling portion on outer circumferential surface 71a. Owing to the coupling between inner circumferential surface 60a of inner gear 60 and outer circumferential surface 71a of connecting portion 71, inner gear 60 is rotatable about axis O (shown in FIG. 1) of input shaft 10 together with oil pump drive shaft 70.

Oil pump housing 50 is disposed coaxially with oil pump drive shaft 70. Oil pump housing 50 has opening 54 at a central portion thereof in an axial direction of oil pump housing 50. Opening 54 extends through oil pump housing 50 in the axial direction of oil pump housing 50. Oil pump drive shaft 70 extends toward the side of motor M through opening 54 in an axial direction thereof, i.e., in the axial direction of oil pump housing 50. Oil pump drive shaft 70 is rotatably supported by inner circumferential surface 52 of oil pump housing 50 which defines opening 54, through bushing 62.

Opening 54 includes increased diameter portion 55 that is increased in diameter and located on the side of motor M of oil pump housing 50. Oil seal 63 is installed into increased diameter portion 55 in contact with the outer circumferential surface of oil pump drive shaft 70. Oil seal 63 has ribs 63a on an inner circumferential surface thereof which are in contact with the outer circumferential surface of oil pump drive shaft 70.

Oil pump drive shaft 70 is supported at at least two portions which are disposed between the connection (i.e., connecting portion 71) with inner gear 60 and reduced diameter portion 72 in order to suppress displacement of an axis of oil pump drive shaft 70 with respect to the axis of oil pump housing 50. Specifically, oil pump drive shaft 70 is supported by both oil pump housing 50 (i.e., inner circumferential surface 52) and radial extension 28 (i.e., inner circumferential surface 28a) of rotational shaft portion 24 of motor M.

Connecting portion 71 of oil pump drive shaft 70 which is located on a side of the one axial end portion of oil pump drive shaft 70, is connected with inner gear 60 as described above. On the other hand, reduced diameter portion 72 of oil pump drive shaft 70 which is located on a side of an opposite axial end of oil pump drive shaft 70, is connected with input shaft 10 such that oil pump drive shaft 70 is rotatable together with input shaft 10. Specifically, inner circumferential surface 72a of an axial tip end portion of reduced diameter portion 72 is connected with the outer circumferential surface of input shaft 10 through a spline joint therebetween. Further, the axial tip end portion of reduced diameter portion 72 is fitted into radial extension 28 of rotational shaft portion 24 so as to form the faucet joint with radial extension 28 as described above. Outer circumferential surface 72b of the axial tip end portion of reduced diameter portion 72 is in contact with inner circumferential surface 28a of radial extension 28.

Middle portion 73 of oil pump drive shaft 70 has groove 74 on an outer circumferential surface thereof over the entire circumference thereof. O-ring 64 is disposed in groove 74 to be partly opposed to and contacted with inner circumferential surface 27b of axial extension 27 of rotational shaft portion 24 of motor M. Axial extension 27 of rotational shaft portion 24 is located on the radial outside of middle portion 73 of oil pump drive shaft 70 via O-ring 64 therebetween.

Input shaft 10 extends through opening 42 of oil pump cover 40 and opening 54 of oil pump housing 50 so as to transmit the rotation inputted from motor M to a side of a transmission mechanism (not shown) through input shaft 10. Input shaft 10 includes projecting portion 10a that projects toward the side of the engine in the axial direction of input shaft 10. Projecting portion 10a is projected toward the side of the engine with respect to the axial tip end of reduced diameter portion 72 of oil pump drive shaft 70. Projecting portion 10a is connected with transmission shaft 12 through a spline joint between an outer circumferential surface of projecting portion 10a and an inner circumferential surface of transmission shaft 12 that transmits the rotation inputted from the side of the engine to input shaft 10.

Rotational shaft portion 24 of motor M has circumferential wall 29 on an outer circumferential side of an axial end surface of the opposite axial end portion thereof. Circumferential wall 29 extends from the outer circumferential side of the axial end surface of rotational shaft portion 24 toward the side of the engine in the axial direction of motor M. Transmission shaft 12 includes flange 12b that extends in a radially outward direction of transmission shaft 12. Flange 12b is interposed between input shaft 10 and circumferential wall 29 and joined with circumferential wall 29 at a welded connection therebetween. Flange 12b is in abutting contact with the axial end surfaces of radial extension 28 and reduced diameter portion 72.

Transmission shaft 12 is rotatably supported by stationary member 13 of transmission casing 11 through radial bearing 36 that is disposed between stationary member 13 and outer circumferential surface 12a of transmission shaft 12.

In the thus constructed automatic transmission 1, the rotation inputted from the side of the engine is inputted to input shaft 10 via transmission shaft 12, and the rotation inputted from the side of motor M is inputted to input shaft 10 via rotational shaft portion 24 of motor M and transmission shaft 12. The rotation inputted to input shaft 10 is transmitted to oil pump drive shaft 70 via the spline joint at reduced diameter portion 72, and then transmitted to inner gear 60 of oil pump OP via connecting portion 71 of oil pump drive shaft 70 so that oil pump OP is driven.

As explained above, in automatic transmission 1 including motor M and oil pump OP which are disposed adjacent to each other in the axial direction of input shaft 10, oil pump drive shaft 70 as the sleeve member which is configured to transmit the rotation to be inputted to input shaft 10 from at least one of the engine and motor M, to inner gear 60 of oil pump OP, is disposed on a radial outside of input shaft 10. Oil pump drive shaft 70 has the one axial end portion that is in alignment with rotational shaft portion 24 of motor M and the opposite axial end portion that is in meshing engagement with inner gear 60. Oil pump drive shaft 70 is supported by oil pump housing 50 and radial extension 28 of rotational shaft portion 24. Outer circumferential surface 27a of axial extension 27 of rotational shaft portion 24 is supported by support portion 31 of partition wall 30 through radial bearing 35. Projection 32 that projects from partition wall 30 toward the side of oil pump OP is fitted onto outer circumferential surface 51 of oil pump housing 50 so as to form a faucet joint in cooperation with oil pump housing 50.

In the above construction, oil pump drive shaft 70 is supported at the two portions which are spaced from each other in the axial direction of oil pump drive shaft 70. That is, oil pump drive shaft 70 is supported at a portion axially adjacent to connecting portion 71 by inner circumferential surface 52 of oil pump housing 50, and supported at the axial tip end portion of reduced diameter portion 72 by inner circumferential surface 28a of extension 28 of rotational shaft portion 24 of motor M. As a result, displacement of the axis of oil pump drive shaft 70 can be suppressed.

Further, projection 32 of partition wall 30 is fitted onto outer circumferential surface 51 of oil pump housing 50. With this construction, oil pump drive shaft 70 can be also supported by outer circumferential surface 51 of oil pump housing 50. Thus, supporting of oil pump drive shaft 70 that is supported by both inner circumferential surface 52 and outer circumferential surface 51 of oil pump housing 50 is performed with reference to a single member, i.e., oil pump housing 50. Accordingly, accuracy in aligning the axis of oil pump drive shaft 70 with an axis of oil pump housing 50 can be enhanced.

Further, rotational shaft portion 24 of motor M and oil pump drive shaft 70 are overlapped with each other in the radial direction of input shaft 10. With this arrangement, it is possible to reduce an axial length of automatic transmission 1 in which motor M and oil pump OP are disposed adjacent to each other in the axial direction of input shaft 10.

Further, reduced thickness portion 33 and projection 32 of partition wall 30 have the reduced thickness, respectively, and bend 33a is formed in the intermediate position of reduced thickness portion 33 such that reduced thickness portion 33 can be elastically deformed. With this construction, when vibration generated by motor M is transmitted to partition wall 30, reduced thickness portion 33 and projection 32 are elastically deformed to thereby damp the vibration inputted. Accordingly, it is possible to prevent oil pump housing 50 from being deformed even when a large stress caused due to the vibration is exerted on the faucet joint-connection between projection 32 and outer circumferential surface 51 of oil pump housing 50.

Reduced thickness portion 33 is not limited to this embodiment in which bend 33a is formed at reduced thickness portion 33 between support portion 31 and projection 32, thereby increasing the total length of reduced thickness portion 33 which extends on both sides of bend 33a and further facilitating the elastic deformation of reduced thickness portion 33. Alternatively, reduced thickness portion 33 can be curved to a large extent in such a direction as to be apart from oil pump housing 50 without forming bend 33a in the intermediate position at reduced thickness portion 33. In such a case, the total length of reduced thickness portion 33 can also be increased to thereby enhance the elastic deformability of reduced thickness portion 33.

Further, reduced thickness portion 33 is not limited to this embodiment in which reduced thickness portion 33 is bulged in such a direction as to be apart from oil pump housing 50. Reduced thickness portion 33 can also be bulged in such a direction as to be closer to oil pump housing 50 as long as the elastic deformability of reduced thickness portion 33 can be enhanced.

This application is based on prior Japanese Patent Application No. 2008-181185 filed on Jul. 11, 2008. The entire contents of the Japanese Patent Application No. 2008-181185 is hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. A sleeve supporting structure for an automatic transmission, the automatic transmission including an input shaft, a motor and an oil pump with an inner gear which are disposed adjacent to each other in an axial direction of the input shaft, the sleeve supporting structure comprising:
a sleeve member that is disposed on a radial outside of the input shaft, the sleeve member is configured to transmit rotation of the input shaft to the inner gear of the oil pump,
a rotational shaft portion that is disposed in the motor;
an oil pump housing that accommodates the inner gear; and
a stationary member that supports an outer circumferential surface of the rotational shaft portion, the stationary member including a projection that projects toward a side of the oil pump,
wherein the sleeve member has one axial end portion that is overlapped with the rotational shaft portion in a radial direction of the sleeve member and an opposite axial end portion that is in meshing engagement with the inner gear, and the sleeve member is supported by an inner circumferential surface of the oil pump housing and an inner circumferential surface of the rotational shaft portion, and
wherein the projection of the stationary member is fitted onto an outer circumferential surface of the oil pump housing so as to form a faucet joint in cooperation with the oil pump housing.

2. The sleeve supporting structure as claimed in claim 1, wherein the stationary member includes a support portion that supports the outer circumferential surface of the rotational shaft portion and a reduced thickness portion that extends from the support portion to a tip end portion of the projection which is fitted onto the outer circumferential surface of the oil pump housing, the reduced thickness portion being bulged so as to be elastically deformable.

3. The sleeve supporting structure as claimed in claim 1, wherein the rotational shaft portion comprises a radial extension that extends in a radially inward direction of the rotational shaft portion, the sleeve member being supported by an inner circumferential surface of the radial extension.

4. The sleeve supporting structure as claimed in claim 2, wherein the rotational shaft portion comprises an axial extension that extends toward a side of the oil pump in an axial direction of the rotational shaft portion, an outer circumferential surface of the axial extension being supported by the support portion of the stationary member.

5. The sleeve supporting structure as claimed in claim 2, wherein the reduced thickness portion of the stationary member is bulged in such a direction as to be apart from the oil pump housing.

6. The sleeve supporting structure as claimed in claim 2, wherein the reduced thickness portion of the stationary member extends from the support portion in a radially outward direction of the input shaft and is bent at a bend in such a direction as to be apart from the motor.

7. The sleeve supporting structure as claimed in claim 3, wherein the radial extension of the rotational shaft portion is fitted onto an outer circumferential surface of the sleeve member so as to form a faucet joint in cooperation with the sleeve member.

8. The sleeve supporting structure as claimed in claim 3, wherein the sleeve member includes a reduced diameter portion that is located on a side of an axial end of the sleeve member, the reduced diameter portion being supported by the inner circumferential surface of the radial extension of the rotational shaft portion.

* * * * *